US010690792B2

(12) United States Patent
Rønholt et al.

(10) Patent No.: US 10,690,792 B2
(45) Date of Patent: Jun. 23, 2020

(54) AMPLITUDE-VERSUS-ANGLE ANALYSIS FOR QUANTITATIVE INTERPRETATION

(71) Applicant: PGS Geophysical AS, Oslo (NO)

(72) Inventors: Grunde Rønholt, Olso (NO); Nizar Chemingui, Houston, TX (US); Alejandro Antonio Valenciano Mavilio, Houston, TX (US); Shaoping Lu, Houston, TX (US)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 16/509,009

(22) Filed: Jul. 11, 2019

(65) Prior Publication Data

US 2019/0331814 A1  Oct. 31, 2019

Related U.S. Application Data

(63) Continuation of application No. 15/012,961, filed on Feb. 2, 2016, now Pat. No. 10,359,526.

(60) Provisional application No. 62/118,647, filed on Feb. 20, 2015, provisional application No. 62/148,239, filed on Apr. 16, 2015.

(51) Int. Cl.
  *G01V 1/36* (2006.01)
  *G01V 1/30* (2006.01)
  *G01V 1/38* (2006.01)
  *G01V 1/28* (2006.01)

(52) U.S. Cl.
  CPC .............. *G01V 1/306* (2013.01); *G01V 1/282* (2013.01); *G01V 1/30* (2013.01); *G01V 1/368* (2013.01); *G01V 2210/632* (2013.01)

(58) Field of Classification Search
  CPC .......... G01V 1/28; G01V 11/00; G01V 1/282; G01V 1/306; G01V 1/368; G01V 1/03
  See application file for complete search history.

(56) References Cited

U.S. PATENT DOCUMENTS

| | | |
|---|---|---|
| 5,111,310 A | 5/1992 | Parker et al. |
| 6,128,415 A | 10/2000 | Hultgren et al. |
| 2005/0073910 A1 | 4/2005 | Cole et al. |
| 2008/0189043 A1 | 8/2008 | Anno et al. |
| 2010/0177595 A1 | 7/2010 | Khare et al. |
| 2011/0273961 A1 | 11/2011 | Hu et al. |
| 2012/0221248 A1 | 8/2012 | Yarman et al. |
| 2013/0021873 A1 | 1/2013 | Mattocks et al. |
| 2013/0322205 A1 | 12/2013 | Widmaier et al. |
| 2014/0119157 A1 | 5/2014 | Whitmore, Jr. et al. |
| 2014/0303896 A1 | 10/2014 | Wrobel et al. |
| 2015/0078124 A1 | 3/2015 | Lu et al. |
| 2015/0331123 A1 | 11/2015 | Guigne et al. |

OTHER PUBLICATIONS

Rutherford, et al., "Amplitude-versus-offset variations in gas sands" Geophysics. vol. 54. No. 6 (Jun. 1989) pp. 680-688 (12 figs).

(Continued)

*Primary Examiner* — Brian Turner

(57) ABSTRACT

Amplitude-versus-angle analysis for quantitative interpretation can include creation of a plurality of angle gathers from imaging a subsurface location with multiples in a near-offset range and imaging primaries outside the near-offset range and application of an amplitude-versus-angle analysis to the plurality of angle gathers to produce a quantitative interpretation pertaining to the subsurface location.

20 Claims, 10 Drawing Sheets

(56) References Cited

OTHER PUBLICATIONS

Sava, et al., "Amplitude-preserved common image gathers by wave-equation migration" Sergey Fomel, Lawrence Berkeley National Laboratory (2001) (4 pgs).
Petroleum Geo-Services, "Separated Wavefield Imaging: PGS SWIM" Jun. 11, 2015 (2 pgs).
Shen, et al., "Improving subsalt imaging with illumination-based weighting of RTM 3D angle gathers" SEG San Antonio 2011 Annual Meeting (6 pgs).
Sava, et al., "Angle-domain common-image gathers by wavefield continuation methods" Geophysics, vol. 68, No. 3 (May-Jun. 2003); p. 1065-1074, 14 Figs.
1st Mexican Office Action for related Mexican Application MX/A/2016/002277, dated Feb. 25, 2019 (Original and Translated Copy) (10 pgs total).
European Search Report for related EP Application No. 16156133.7, dated Jul. 25, 2016 (11 pgs).
N.D. Whitmore, et al., "Imaging of Primaries and Multiples using a dual-sensor towed streamer", SEG Denver 2010 Annual Meeting (6 pgs).
Lu, et al., "Illumination from 3D imaging of Multiples: An Analysis in the Angle Domain", SEG Denver 2014 Annual Meeting (5 pgs).
Malaysian Substantive Examination Report for related Malaysian Application PI 2016700543, dated Aug. 27, 2019 (4 pgs).

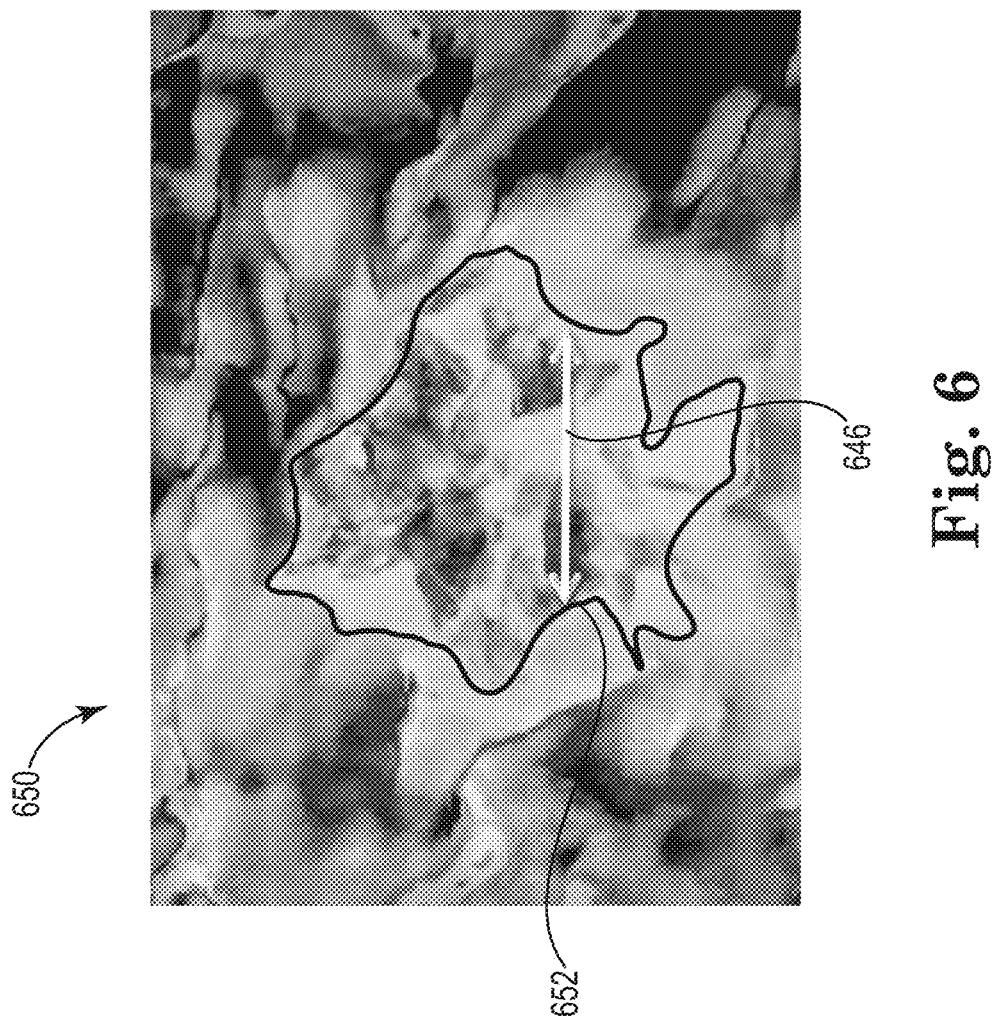

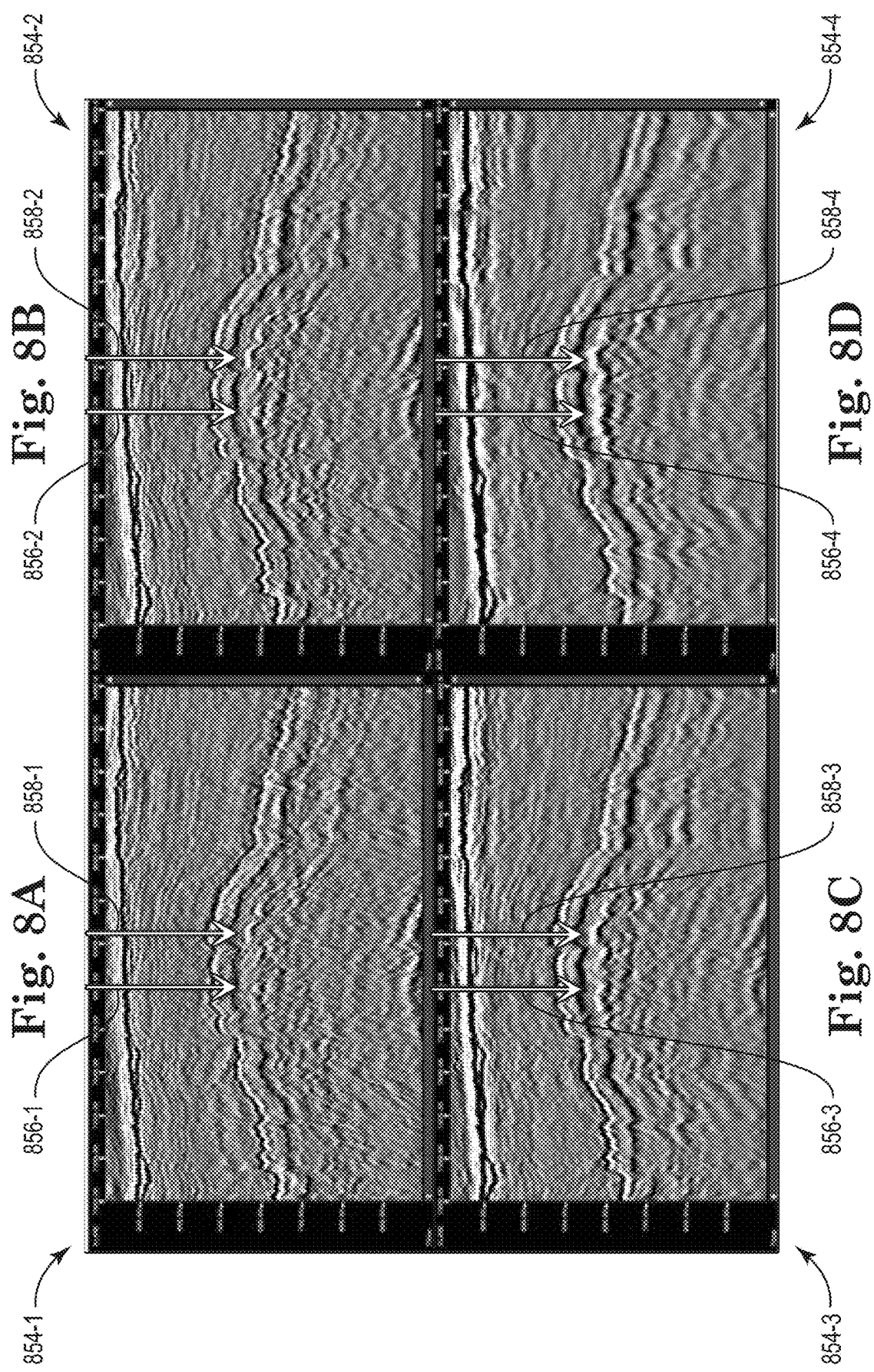

CREATING A PLURALITY OF ANGLE GATHERS FROM IMAGING A SUBSURFACE LOCATION WITH MULTIPLES OVER A PLURALITY OF ANGLES, WHEREIN THE SUBSURFACE LOCATION IS SHALLOW SUCH THAT PRIMARIES ARE NOT RECEIVED FROM THE SUBSURFACE LOCATION FOR A NEAR-OFFSET RANGE ~1190

APPLYING AN AMPLITUDE-VERSUS-ANGLE ANALYSIS TO THE PLURALITY OF ANGLE GATHERS TO PRODUCE A QUANTITATIVE INTERPRETATION PERTAINING TO THE SUBSURFACE LOCATION ~1192

AMPLITUDE-VERSUS-ANGLE ANALYSIS FOR QUANTITATIVE INTERPRETATION

CROSS-REFERENCE TO RELATED APPLICATIONS

This application claims priority to U.S. application Ser. No. 15/012,961 filed on Feb. 2, 2016, which will issue as U.S. Pat. No. 10,359,526 on Jul. 23, 2019, which claims priority to U.S. Provisional Application 62/118,647, filed Feb. 20, 2015, and U.S. Provisional Application 62/148,239, filed Apr. 16, 2015, which are incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are helpful for quantitative seismic interpretation and improved reservoir monitoring. For a typical marine seismic survey, a marine survey vessel tows one or more seismic sources below the sea surface of the water and over a subterranean formation to be surveyed for mineral deposits. Seismic receivers may be located on or near the seafloor, on one or more streamers towed by the marine survey vessel, or on one or more streamers towed by another vessel. The marine survey vessel typically contains marine seismic survey equipment, such as navigation control, seismic source control, seismic receiver control, and recording equipment. The seismic source control may cause the one or more seismic sources, which can be air guns, marine vibrators, etc., to produce acoustic signals at selected times. Each acoustic signal is essentially a sound wave called a wavefield that travels down through the water and into the subterranean formation. At each interface between different types of rock, a portion of the wavefield may be refracted, and another portion may be reflected, which may include some scattering, back toward the body of water to propagate toward the sea surface. The seismic receivers thereby measure a wavefield that was initiated by the actuation of the seismic source.

BRIEF DESCRIPTION OF THE DRAWINGS

FIG. 6 illustrates a full waveform inversion velocity model overlaid on a seismic image at a shallow depth.

FIGS. 8A-8D illustrate angle stacks from imaging a subsurface location with multiples.

FIG. 11 illustrates a method flow diagram for amplitude-versus-angle analysis for quantitative interpretation.

DETAILED DESCRIPTION

Figure 1:
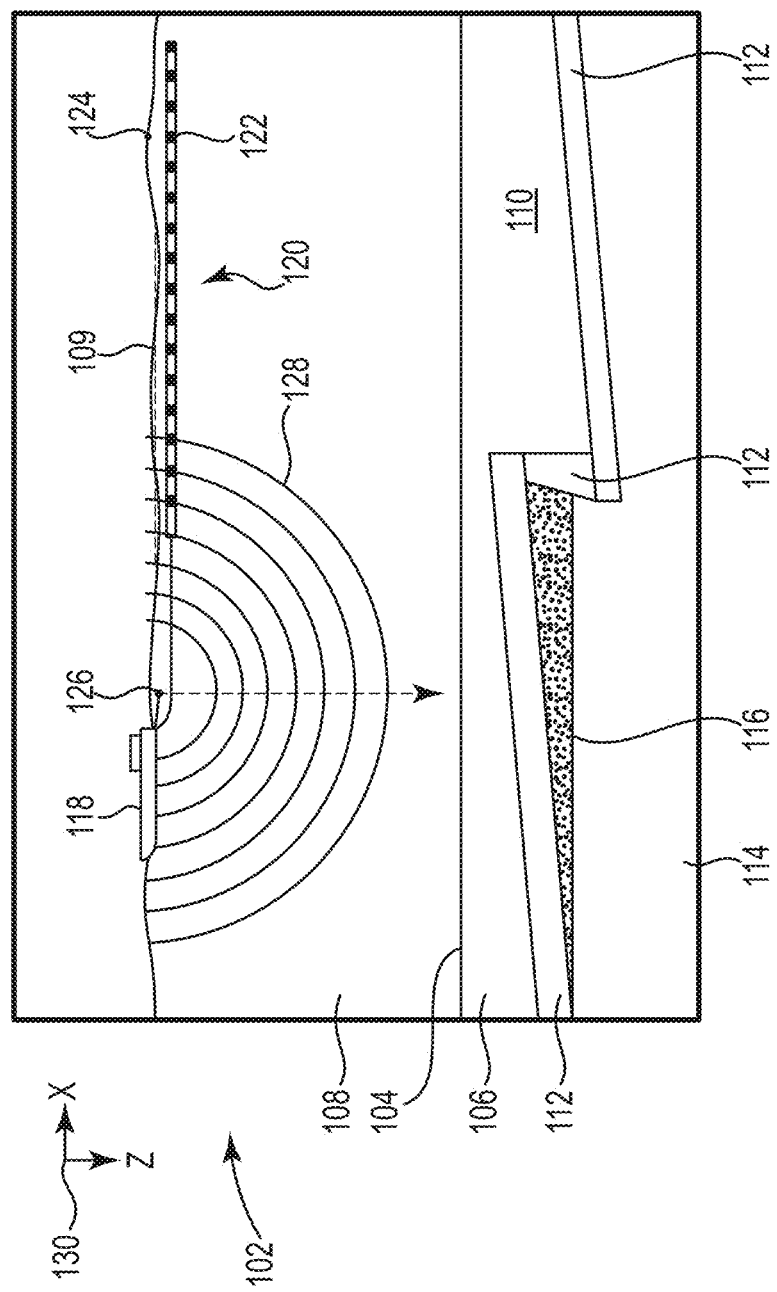
FIG. 1 illustrates an elevation or xz-plane view of marine seismic surveying in which acoustic signals are emitted by a seismic source for recording by seismic receivers for processing and analysis in order to help characterize the structures and distributions of features and materials underlying the solid surface of the earth.

The present disclosure is related to amplitude-versus-angle analysis for quantitative interpretation. A seismic source can emit an acoustic signal. Examples of seismic sources include air guns and marine vibrators, among others. Pressure and particle motion variation as a function of time and position caused by an acoustic signal from a seismic source or modeled as being emitted by a modeled seismic source is called the "source wavefield." Pressure and particle motion variation as a function of time and position measured by a seismic receiver or modeled as being received by a modeled seismic receiver is called the "receiver wavefield."

Goals of seismic processing can include mathematically transforming recorded reflections into seismic images of the earth's subsurface. For example, seismic processing methods can include mathematically simulating wave propagation using a computer, where boundary data from a sea surface can be extrapolated into a model of the subsurface. The boundary data at the sea surface can consist of two parts: a source wavefield, and a receiver wavefield. Some wave equation seismic imaging methods can include propagating source and receiver wavefields from the sea surface into an earth model (e.g., subsurface model) and can produce a seismic image by computing the locations where a source wavefield and a receiver wavefield are in phase. This process is generally referred to as seismic imaging.

The present disclosure describes various embodiments relating to primary reflections ("primaries") and multiple reflections ("multiples"). Primaries are generally up-going reflections of a down-going source wavefield. Multiples can be divided into down-going multiples and up-going multiples. A down-going multiple is a reflection of a wavefield (whether a primary or a multiple) off of a sea surface. An up-going multiple is a reflection of a down-going multiple. Some seismic imaging algorithms only make use of primaries. However, multiples can carry valuable information. According to the present disclosure, it can be beneficial to incorporate multiples in seismic imaging algorithms.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 118 may reference element "18" in FIG. 1, and a similar element may be referenced as 218 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine seismic surveying in which acoustic signals are emitted by a seismic source 126 for recording by seismic receivers 122 for processing and analysis in order to help characterize the structures and distributions of features and materials underlying the solid surface of the earth. FIG. 1 shows a domain volume 102 of the earth's surface comprising a solid volume 106 of sediment and rock below the solid surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine seismic surveys. FIG. 1 illustrates a first sediment layer 110, an uplifted rock layer 112, second, underlying rock layer 114, and hydrocarbon-saturated layer 116. One or more elements of the solid volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine seismic surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which seismic receivers may be connected. In one type of marine seismic survey, each seismic receiver, such as the seismic receiver 122 represented by the shaded disk in FIG. 1, comprises a pair of seismic sensors including a geophone that detects particle displacement within the water by detecting particle motion variation, such as velocities or accelerations, and/or a hydrophone that detects variations in pressure. The streamers 120 and the marine survey vessel 118 can include sophisticated sensing electronics and data-processing facilities that allow seismic receiver readings to be correlated with absolute positions on the sea surface and absolute three-dimensional positions with respect to a three-dimensional coordinate system. In FIG. 1, the seismic receivers along the streamers are shown to lie below the sea surface 109, with the seismic receiver positions correlated with overlying surface positions, such as a surface position 124 correlated with the position of seismic receiver 122. The marine survey vessel 118 can also tow one or more seismic sources 126 that produce acoustic signals as the marine survey vessel 118 and streamers 120 move across the sea surface 109. Seismic sources 126 and/or streamers 120 may also be towed by other vessels, or may be otherwise disposed in fluid volume 108. For example, seismic receivers may be located on ocean bottom cables or nodes fixed at or near the solid surface 104, and seismic sources 126 may also be disposed in a nearly-fixed or fixed configuration.

FIG. 1 shows an expanding, spherical acoustic signal, illustrated as semicircles of increasing radius centered at the seismic source 126, representing a down-going wavefield 128, following an acoustic signal emitted by the seismic source 126. The down-going wavefield 128 is, in effect, shown in a vertical plane cross section in FIG. 1. The outward and downward expanding down-going wavefield 128 may eventually reach the solid surface 104, at which point the outward and downward expanding down-going wavefield 128 may partially scatter, may partially reflect back toward the streamers 120, and may partially refract downward into the solid volume 106, becoming elastic acoustic signals within the solid volume 106.

Acquisition and processing techniques can be used to extract up-going and down-going wavefields. In a marine setting, multi-sensor seismic receivers, such as hydrophone and/or vertical geophone, etc., and/or wavefield separation can be used to extract such wavefields. Approximations of up-going and/or down-going wavefields can be determined by other methods of deghosting.

Figure 2:
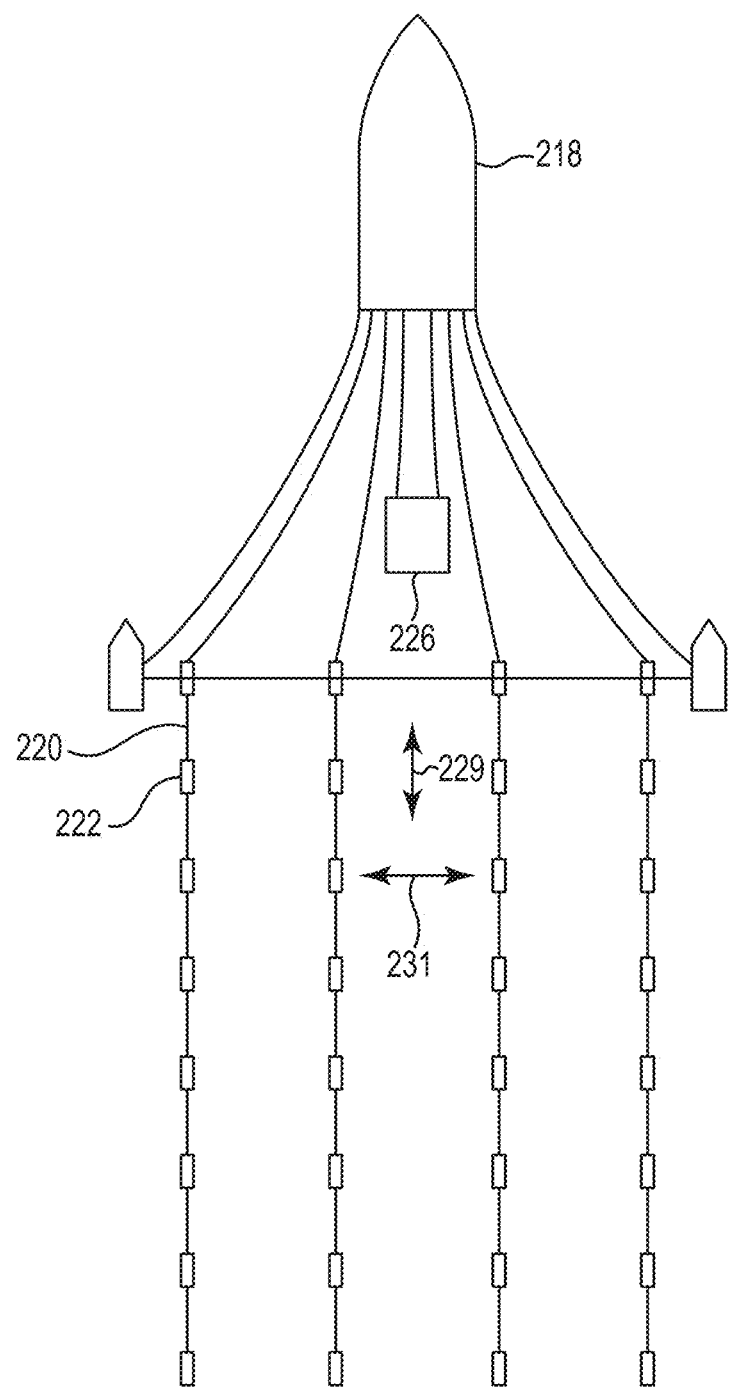
FIG. 2 illustrates a top view of marine seismic surveying.

FIG. 2 illustrates a top view of marine seismic surveying. FIG. 2 shows an example of a marine survey vessel 218, analogous to the marine survey vessel 118 illustrated in FIG. 1, equipped to carry out marine seismic surveys. The marine survey vessel 218 can tow one or more streamers 220, analogous to the streamer 120 illustrated in FIG. 1. The streamers can include one or more seismic receivers 222, analogous to the seismic receivers 222 illustrated in FIG. 1. The marine survey vessel can tow one or more seismic sources 226, analogous to the seismic sources 126 illustrated in FIG. 1. The recorded seismic data can be three-dimensional in that it includes data from wavefields traveling in both an inline direction 229 and a crossline direction 231, plus depth. The inline direction 229 is generally in line with the one or more seismic sources 226 with respect to a direction of travel of the marine survey vessel 218 and/or with respect to a length of seismic receivers 222 along a streamer 220 or ocean bottom cable. The crossline direction 231 is generally perpendicular to the inline direction 229 and crosses the length of seismic receivers 222 along a streamer 220 or ocean bottom cable. The streamers 220 or ocean bottom cables are generally spaced apart in the crossline direction 231. In at least one embodiment, the streamers 220 can be towed in a curved path.

The marine survey vessel 218 can include a control system and a recording system, which may be separate systems that communicate data between each other, or they may be sub-systems of an integrated system. The control system can be configured to selectively actuate the seismic sources 226, while the recording system can be configured to record the signals generated by seismic receivers 222 in response to the seismic energy imparted into the water and thereby into subterranean material formations below the solid surface. The recording system can be configured to determine and record the geodetic positions of the seismic energy sources and the seismic receivers 222 at any time.

Source actuation and signal recording by the seismic receivers 222 may be repeated a plurality of times while the marine survey vessel 218 moves through the water. Each actuation record may include, for each seismic receiver 222, signals corresponding to the seismic energy produced by the seismic source 226.

In a shallow water environment, for instance as found in parts of the Barents Sea, some previous imaging approaches may have difficulty successfully resolving a near surface. This may be due to the lack of primaries in a near-offset (angle) range in typical marine seismic data, caused by a large minimum distance between a seismic source and a seismic receiver. The near-offset range can be in either the inline direction 229 or the crossline direction 231. An example including wavefields is illustrated in more detail in FIG. 3. In contrast, at least one embodiment of the present disclosure includes using separated up-going wavefields and down-going wavefields provided, for example by multi-sensor cable technology, to construct angle gathers that span a range of seismic incidence angles. For example, each seismic receiver may be used as a modeled seismic source, resulting in the providing of a data set that has coverage of zero- and near-offset ranges under the seismic spread. In particular, examples may provide near-offset range data for shallow targets that are not sampled by primaries, enabling amplitude-versus-angle (AVA) analysis to be carried out. As used herein, AVA is interchangeable with amplitude versus offset (AVO). AVA analysis is a technique that can be executed on seismic data to determine properties of a subsurface location, such as fluid content, porosity, density, seismic velocity, shear wave information, fluid indicators, etc. The AVA results may be used to derive a direct hydrocarbon indicator (DHI) that may otherwise be impossible to achieve using primaries alone. A DHI is a seismic attribute found via reflection seismology that indicates the presence of hydrocarbons in a reservoir. A trace is data measured by a seismic receiver as a time series that includes a number of consecutively, continuously, or near-continuously measured values, called amplitudes, separated in time by a sample rate (unless continuous). A gather is a set of traces that share a geometric attribute. An angle gather is a set of traces for different reflection angles at a reflector.

By way of example, a 5,600 km² seismic survey covering the northern area of the former disputed zone between Norway and Russia was acquired in the Barents Sea. In such an example, a vessel deployed ten deep towed (15 meters) multi-sensor cables, each 7 kilometers long and 75 meters apart. This relatively small cable separation, for instance as compared to a more common 100 meter separation for exploration surveys, can be used to improve illumination of shallow targets.

Figure 3:
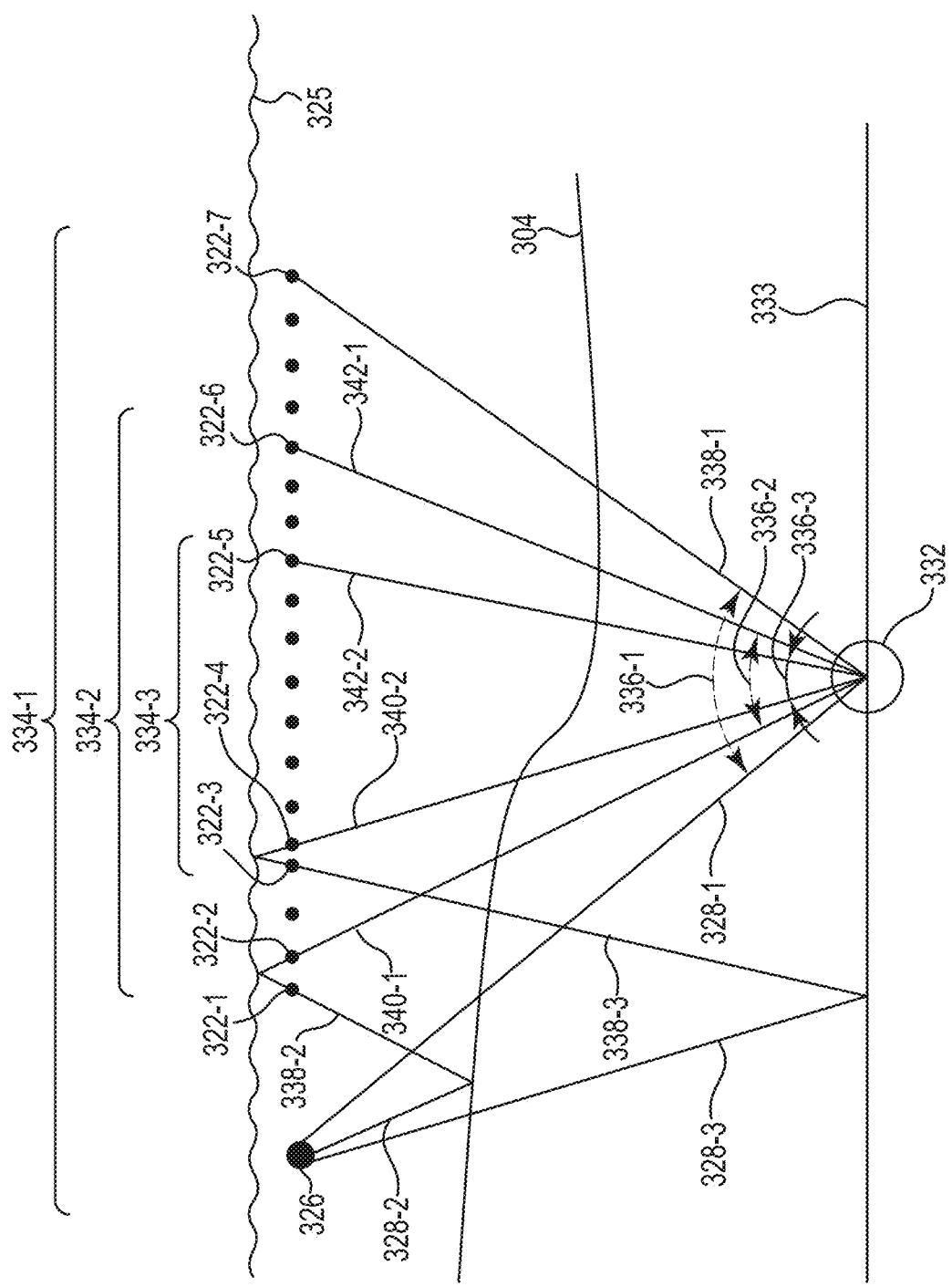
FIG. 3 illustrates an elevation or plane view of a state representing marine seismic surveying including primaries and multiples represented as rays.

FIG. 3 illustrates an elevation or plane view of a state representing marine seismic surveying including primaries and multiples represented as rays. The state can include a sea surface 325, a solid surface 304, and a subsurface reflector 333 underlying the solid surface 304. The state can include a seismic source 326 that can emit a down-going source wavefield represented as a first down-going ray 328-1, a second down-going ray 328-2, and a third down-going ray 328-3. The state can include a plurality of seismic receivers 322-1, 322-2, 322-3, 322-4, 322-5, 322-6, 322-7, referred to generally herein as seismic receivers 322. The first down-going ray 328-1 can reflect off of the subsurface reflector 333 at a subsurface location 332 as a first up-going primary 338-1, which can be received by the seismic receiver 322-7. The second down-going ray 328-2 can reflect off of the solid surface 304 as a second up-going primary 338-2, which can be received by the seismic receiver 322-1. The third down-going ray 328-3 can reflect off of the subsurface reflector 333 at a location other than at the subsurface location 332 as a third up-going primary 338-3, which can be received by the seismic receiver 322-3.

The first down-going ray 328-1 and its corresponding up-going primary 338-1 form a first angle 336-1. The first angle 336-1 corresponds to a first offset 334-1. The first up-going primary 338-1 is the only primary that is received from the subsurface location 332. At least one embodiment can include performing separated wavefield imaging (SWIM) to provide seismic data for a near-offset range in which primaries are not received from the subsurface location 332. SWIM includes using up-going wavefields and down-going wavefields that are calculated at the seismic receivers 322 as inputs to migration, such as wave equation migration. Migration is a process by which seismic events are geometrically re-located in either space or time to the location in the subsurface at which the event occurred, rather than the location at which the event was recorded. By doing so, the seismic receivers 322 can be used as modeled seismic sources (also known as "virtual sources") to provide additional illumination of the subsurface, which is different than the illumination provided by imaging the subsurface location with the primaries. In the example illustrated in FIG. 3, the second up-going primary 338-2 can be reflected back down as a first down-going multiple 340-1, which can be modeled as a source wavefield from the seismic receiver 322-2 (e.g., where the seismic receiver 322-2 is modeled as a modeled seismic source). Likewise, the third up-going primary 338-3 can be reflected back down as a second down-going multiple 340-2, which can be modeled as a source wavefield from the seismic receiver 322-4 (e.g., where the seismic receiver 322-4 is modeled as a modeled seismic source). At least one embodiment can make use of a reflection of an up-going source wavefield off of the sea surface 325 as a modeled source wavefield from a modeled seismic source (as opposed to an up-going multiple being reflected off of the sea surface 325). In such an example, the modeled seismic source would actually be a seismic receiver.

The first down-going multiple 340-1 and the second down-going multiple 340-2 can reflect off of the subsurface location 332 as a first up-going multiple 342-1 and a second up-going multiple 342-2, respectively. The first up-going multiple 342-1 can be received by the seismic receiver 322-6 and the second up-going multiple 342-2 can be received by the seismic receiver 322-5. The first down-going multiple 340-1 and the first up-going multiple 342-1 form a second angle 336-2. The second down-going multiple 340-2 and the second up-going multiple 342-2 form a third angle 336-3. The second angle 336-2 and the third angle 336-3 are in the near-offset range because they correspond to a second offset 334-2 and a third offset 334-3, respectively, which are within the first offset 334-1 created by the source wavefield represented as the first down-going ray 328-1 and the primary 338-1, which is received by the seismic receiver 322-7. In other words, the second angle 336-2 and the third angle 336-3 are in the near offset range because they are in an offset range where no primaries are received from the subsurface location 332 for a given source wavefield. Thus, the primary 338-1 is received by the seismic receiver 322-7 outside of the near-offset range. The near-offset range is within the offset range 334-1.

The subsurface location 332 can be sampled more than once, where each sample may have different source and receiver locations. The seismic data generated from sampling the subsurface location 332 can be processed to preserve amplitudes and determine the spatial coordinates of each sample. A group of traces can be constructed with a range of offsets that all sample the same subsurface location 332 to perform AVA analysis. For example, a common midpoint gather may be used. The average amplitude can be calculated along the time sample by stacking.

Figure 4:
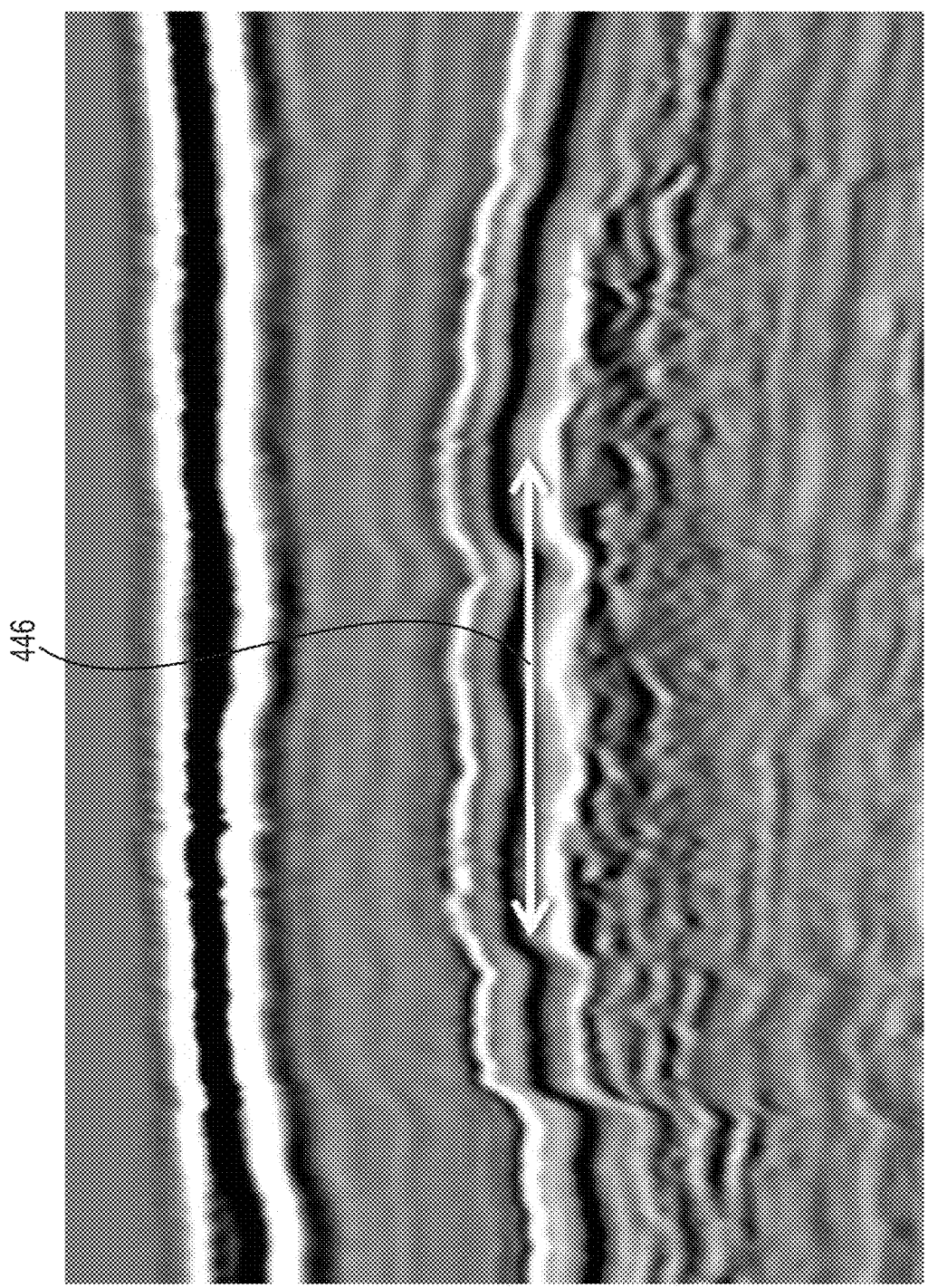
FIG. 4 illustrates an angle stack including amplitude brightening.

FIG. 4 illustrates an angle stack 454 including amplitude brightening. For example, throughout the Barents Sea, main plays consist in shallow, high amplitude events and/or flat spots. The high amplitude may be a response to the combination of lithology and fluids. Low or high gas saturation, as well as oil, may appear with a similar seismic response, as illustrated in FIG. 4, which may make finding a discriminating DHI difficult. In the example illustrated in FIG. 4, the white event shown below the arrow 446 illustrates amplitude brightening.

Acquiring three-dimensional seismic data in shallow waters may involve a compromise between efficiency and near-surface sampling. For instance, the wider the spread (e.g., the number of streamers times streamer separation), the larger the distance between sail lines, resulting in more efficient data gathering. However, this configuration may suffer from acquisition footprint due to the lack of small offsets recorded on the outer streamers. This lack of near-offset range data at the swath boundaries may leave shallow illumination holes, which may limit an ability to pick velocities based on gather flatness, and prevent the use of AVA type studies. As described herein, sea surface reflections, which may be captured in a down-going wavefield of multi-cable acquisitions, may be used as modeled seismic sources and provide the near-seismic receiver surface information missing from the primaries. A complete wavefield imaging (CWI) workflow can unravel shallow heterogeneities, such as are prevalent in the North Sea, and can obtain more accurate depth models. In the case of the Barents Sea, sea surface reflections may provide a direct and improved image of shallow targets, along with full angle gathers and the potential for a more discriminating DHI.

Figure 5:
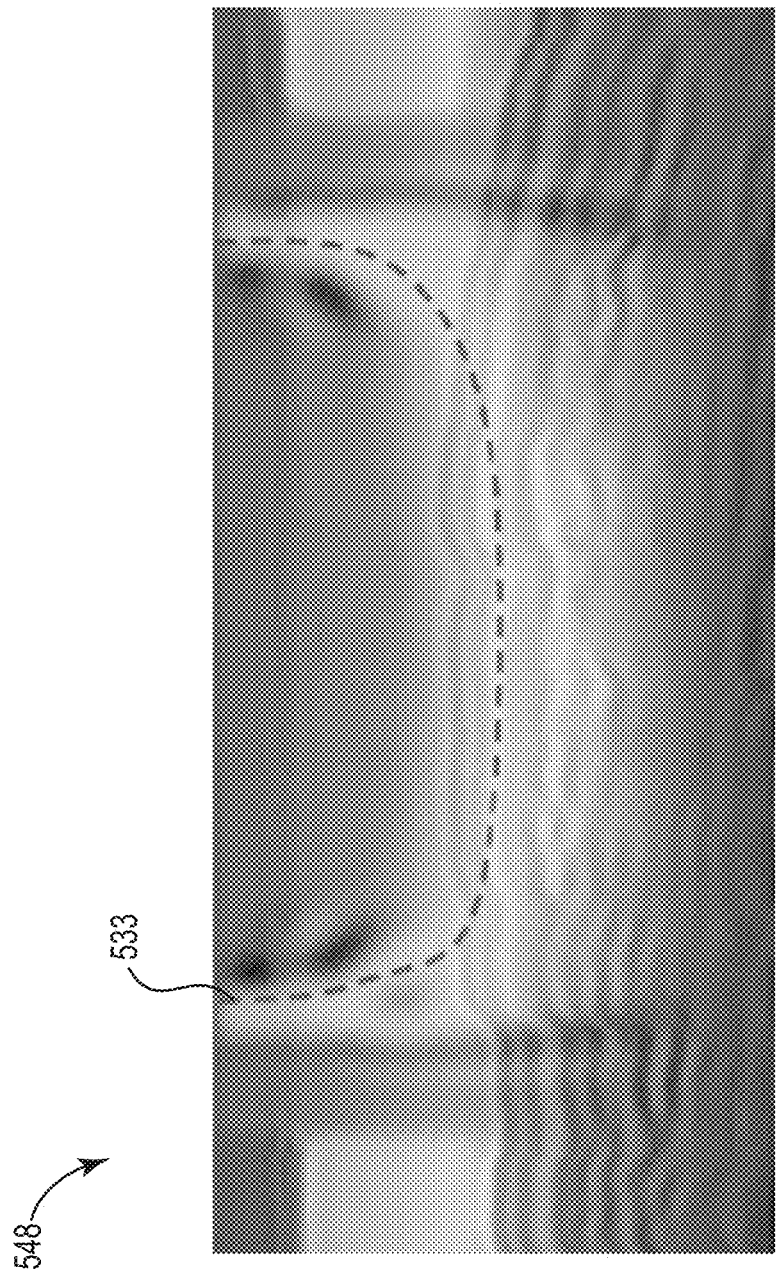
FIG. 5 illustrates a velocity model overlaid on a seismic image of a shallow target structure.

FIG. 5 illustrates a velocity model overlaid on a seismic image 548 of a shallow target structure. FIG. 5 illustrates that refracted and other diving waves propagate through the shallow targets. An illustration of a forward modelled, 2-6 Hz diving wave has been superimposed to the plot—where the white event (highlighted with a dashed line 533) represents the wave propagation. The seismic source to seismic receiver offset for the modeled wave is 6 kilometers and the depth shown is from 0 to 1.5 kilometers.

In complete wavefield imaging (CWI), a velocity model building workflow may be made up of three main elements: wavelet shift tomography, full waveform inversion (FWI), and SWIM. Wavelet shift tomography can invert densely packed residuals measured in a 3D sense with a focus on anisotropy for a shallow overburden in order to better match observed and modeled refractions. FWI is a non-linear data-fitting procedure that aims at obtaining detailed estimates of subsurface properties from seismic data. In FWI, given an initial guess of subsurface parameters, a model is predicted by solving a wave equation, which is then updated in order to reduce the misfit between the observed and predicted data; this is repeated iteratively until the data misfit is sufficiently small. Producing accurate velocity models includes combining these elements, also known as algorithms into a workflow that mitigates weakness that may exist in any one algorithm alone. Leveraging low frequency data recorded by multi-sensor seismic receivers towed deeply, FWI may produce high resolution velocity updates from the seafloor down to depths where refracted energy diminishes.

Conventional depth migration with primaries backward extrapolates the upcoming data as seismic receiver wavefields and forward extrapolates a modeled seismic source (e.g., a seismic receiver modeled as a seismic point source). In SWIM, after carrying out wavefield separation using a multi-sensor seismic receiver recording of the wavefield, the down-going wavefield is used as a seismic source wavefield and the up-going wavefield as a seismic receiver wavefield. This may turn each seismic receiver into a modeled seismic source, hence increasing the seismic source sampling and coverage at the surface. The improved seismic data coverage this provides helps to mitigate acquisition footprint and provides enhanced angular illumination in the shallow subsurface. Because of the complexity of the interaction of the up-going wavefields and the down-going wavefields, a deconvolution imaging condition may be applied at the subsurface location. This may reduce crosstalk noise generated from unrelated correlation of up-going wavefields and down-going wavefields. For example, crosstalk can be generated by source and receiver wavefields being in phase at locations that are not the same location as a subsurface reflector. Deconvolution can reverse the effects of convolution on recorded data, where convolution assumes that the recorded data is a combination of a reflectivity function and a source wavefield from a point source. Angle gathers can be generated from subsurface offset gathers after applying a radial trace transform. A subsurface offset gather can include a succession of traces that have a same offset distance between a source and a receiver. A radial trace transform can be envisioned as overlaying a gather with a fan of constant-velocity trajectories radiating from a common origin, and then extracting samples along each of the linear trajectories from the underlying traces, which can include interpolation in some instances. The angle gathers obtained from imaging the subsurface location with multiples can provide improved illumination as compared to gathers obtained from primary reflection migrations.

FIG. 6 illustrates a full waveform inversion velocity model overlaid on a seismic image 650 at a shallow depth. For example, the depth can be 600 meters. The Barents Sea is known for its hard seafloor due to older, compacted sediments being exposed by uplift and erosion during the last ice age. Locally, slightly slower quaternary sediments may be exposed. Highly compacted shales may exhibit a significant anisotropy regime with horizontal velocities as much as 35 percent higher than vertical velocities. Seismic anisotropy refers to the directional dependence of the velocity of seismic waves in a medium. A starting gradient velocity model with corresponding anisotropy parameters may be established based on scanning and evaluation of modeled versus observed refractions, migrated reflection, and multiple gather move-out. An anisotropy parameter describes anisotropy. Examples of anisotropy parameters include a short offset effect, a long offset effect, and a shear wave effect. Velocity can be updated and anisotropy parameters can be adjusted through the use of wavelet shift tomography. A long wavelength velocity model can be achieved describing the refractions, primary reflections, and sea-surface reflection data. Iterative FWI can be run in order to solve for gradually shorter wavelengths of velocity as illustrated in FIG. 6. FIG. 6 includes a high level of detail at the faulted crest of the structure 652 and co-located with the bright spots seen in a reflection image (e.g., as indicated by the arrow 646, which is the same location as arrow 446 in FIG. 4).

Figure 7A:
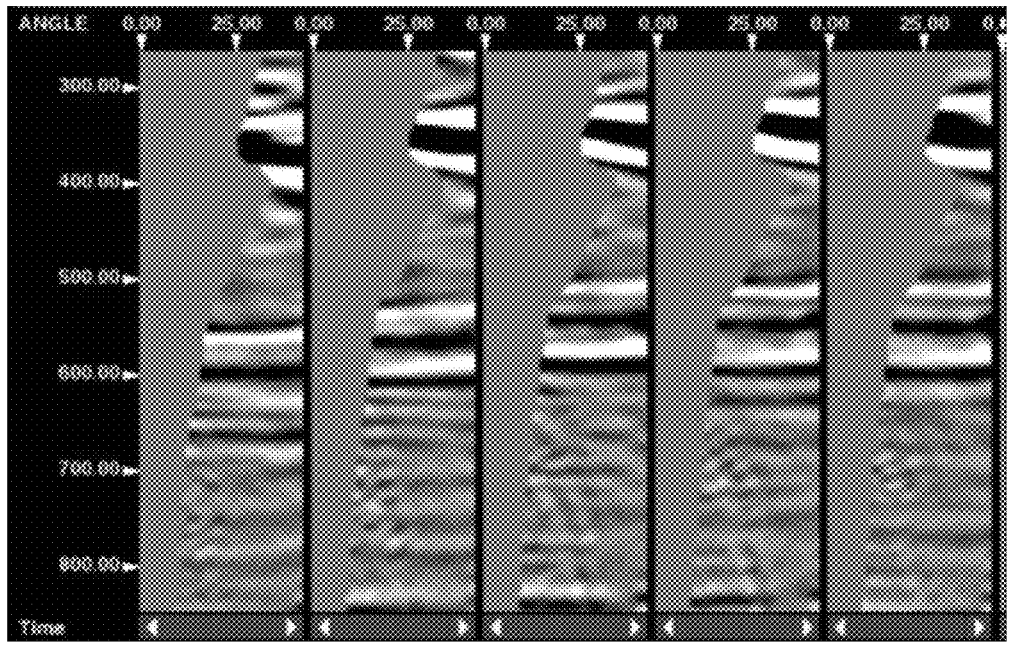
FIG. 7A illustrates an angle gather from imaging a subsurface location with primaries.
Figure 7B:
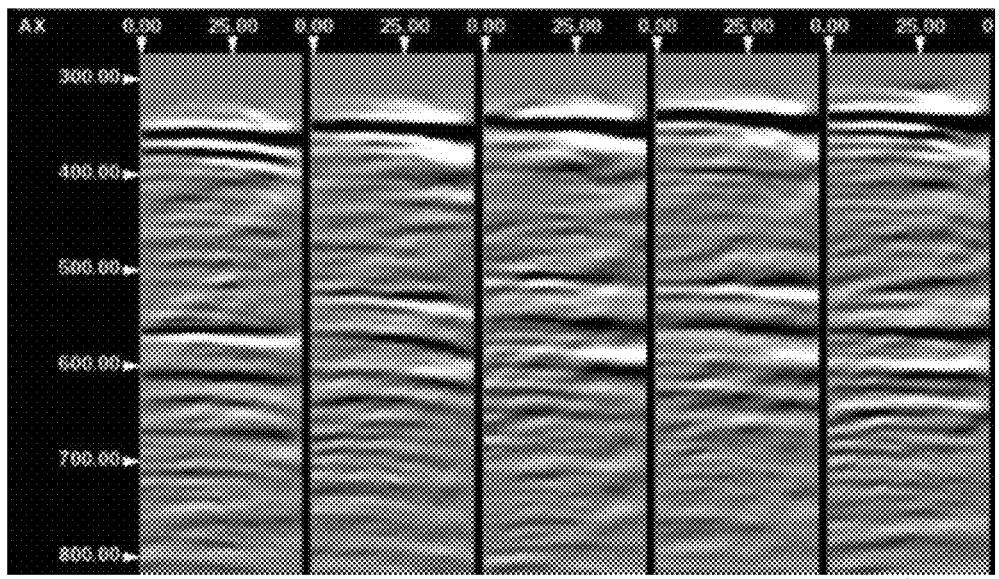
FIG. 7B illustrates an angle gather from imaging a subsurface location with multiples.

FIG. 7A illustrates an angle gather 744-1 from imaging a subsurface location with primaries. FIG. 7B illustrates an angle gather 744-2 from imaging a subsurface location with multiples. The velocity model after FWI may be used to migrate both up-going wavefields (e.g., primaries) and down-going wavefields (e.g., sea-surface reflections). The resulting angle gathers can show different illumination as illustrated in FIGS. 7A and 7B. The five gathers in each of FIGS. 7A and 7B are from the same relative location, and the horizontal axis is angle in degrees, 0 to 45. The gathers from imaging the subsurface location with primaries lack contributions to the near-angles due to the relatively large minimum offset acquired relative to target depth. At a depth of 600 meters, the minimum angle can vary from 15 to 20 degrees. The gathers from imaging the subsurface location with multiples can display a full angular coverage from 0 to 45 degrees.

FIGS. 8A-8D illustrate angle stacks 854-1, 854-2, 854-3, 854-4 from imaging a subsurface location with multiples. The angle stacks 854-1, 854-2, 854-3, 854-4 are generally referred to as angle stacks 854. The stack 854-1 in FIG. 8A is from 0-10 degrees, the stack 854-2 in FIG. 8B is from 10-20 degrees, the stack 854-3 in FIG. 8C is from 20-30 degrees, and the stack 854-4 in FIG. 8D is from 30-40 degrees. The area indicated by the right arrow 858-1, 858-2, 858-3, 858-4 in each of FIGS. 8A-8D exhibits a near-to-far slight, gradual increase in amplitude, while the area indicated by the left arrow 856-1, 856-2, 856-3, 856-4 in each of FIGS. 8A-8D exhibits a much higher increase in amplitude from near-to-far angles.

For a selected line, both Class 2 (full dimming at near angles) and Class 3 (slight dimming at near angles) AVA anomalies may be observed. More analysis may be performed to correlate these two AVA behaviors with specific fluids and lithology content, but their clear differentiation can allow for definition of a discriminating DHI. The primaries alone, with their inherent limitation to far-angles, may not distinguish Class 2 from Class 3 AVA anomalies.

As described herein, imaging shallow targets with primaries may require expensive and inefficient seismic acquisition to preserve a small enough near-offset range throughout the survey. This may be impractical in certain locations, for example the Barents Sea, where the weather window is very limited. In contrast, examples of the present disclosure may use sea-surface reflections for imaging to circumvent this because multiples may sample near-angles much better than primaries. Multi-sensor seismic receivers, in addition to increasing the weather window through deep-tow, may provide enhanced low frequencies as well as up-going wavefields and down-going wavefields. These features may be used to determine an accurate shallow velocity model and provide a high resolution image of the shallow targets. Multiples may also provide fully populated angle gathers, which enable AVA analysis. Shallow bright spots in the Barents Sea South East may exhibit both Class 2 and Class 3 AVA behaviors. Even without a correlation to specific fluids and lithology, a distinction may be pronounced and discriminating. Such a DHI may not be obtained with primaries alone due to their deficiency in near-angles. Multiples, therefore, can provide unique insights for lithology and fluid prediction.

Figure 9:
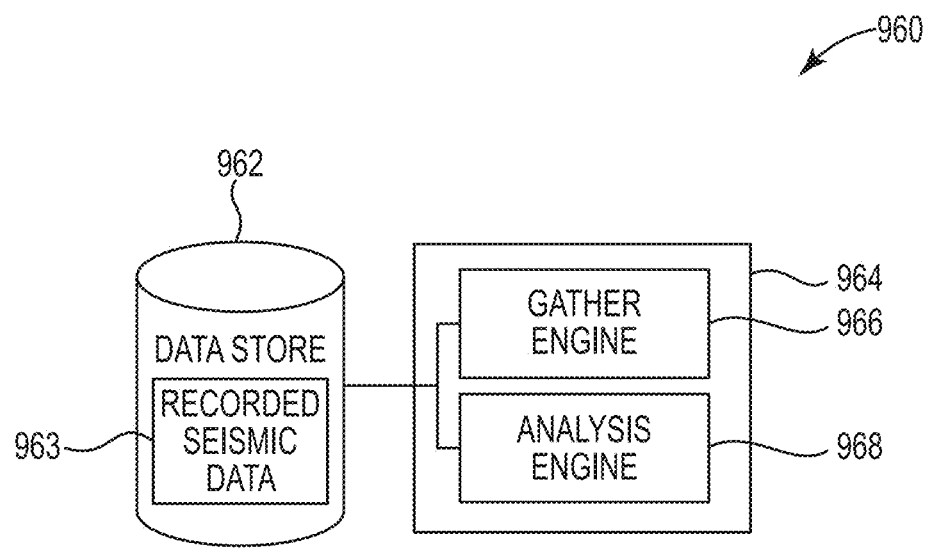
FIG. 9 illustrates a diagram of a system for amplitude-versus-angle analysis for quantitative interpretation.

FIG. 9 illustrates a diagram of a system 960 for amplitude-versus-angle analysis for quantitative interpretation. The system 960 can include a data store 962, a subsystem 964, and/or one or more engines (e.g., gather engine 966 and/or analysis engine 968) and can be in communication with the data store 962 via a communication link. The data store 962 can store recorded seismic data 963 (e.g., as the data is being collected in a marine seismic survey and/or from a previous marine seismic survey). In at least one embodiment, the recorded seismic data was recorded with multi-sensor seismic receivers in water having a depth less than 500 meters. The system 960 can include additional or fewer engines than illustrated to perform the various functions described herein. The system can represent program instructions and/or hardware of a machine (e.g., machine 1070 as referenced in FIG. 10, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform one or more functions described herein. The program instructions, such as software, firmware, etc., can be stored in a memory resource such as a machine-readable medium, etc., as well as hard-wired program such as logic. Hard-wired program instructions can be considered as both program instructions and hardware.

The gather engine 966 can include a combination of hardware and program instructions that is configured to create a plurality of angle gathers from imaging a subsurface location with multiples in a near-offset range and with primaries outside the near-offset range. The gather engine 966 can be configured to separate the recorded seismic data into up-going wavefields and down-going wavefields including the primaries and the multiples. The gather engine 966 can be configured to create the plurality of angle gathers from imaging the subsurface location with multiples outside the near-offset range.

The analysis engine 968 can include a combination of hardware and program instructions that is configured to apply an AVA analysis to the plurality of angle gathers to produce a quantitative interpretation pertaining to the subsurface location. While seismic imaging focuses on imaging the subsurface location, a quantitative interpretation is focused on quantifying a property of the subsurface location. The analysis engine 968 being configured to produce the quantitative interpretation can comprise the analysis engine being configured to determine a property of the subsurface location. The property of the subsurface location can be an existence of a reservoir. The reservoir can be, for example, a hydrocarbon reservoir in a subsurface rock formation. The property of the subsurface location can be a DHI. The analysis engine 968 can be configured to apply a deconvolution imaging condition at the subsurface location to reduce crosstalk from unrelated correlation of the primaries and the multiples. The analysis engine 968 being configured to produce the quantitative interpretation can comprise the analysis engine being configured to predict a lithology of the subsurface location. The analysis engine 968 being configured to produce the quantitative interpretation can comprise the analysis engine being configured to predict presence of a fluid at the subsurface location.

Figure 10:
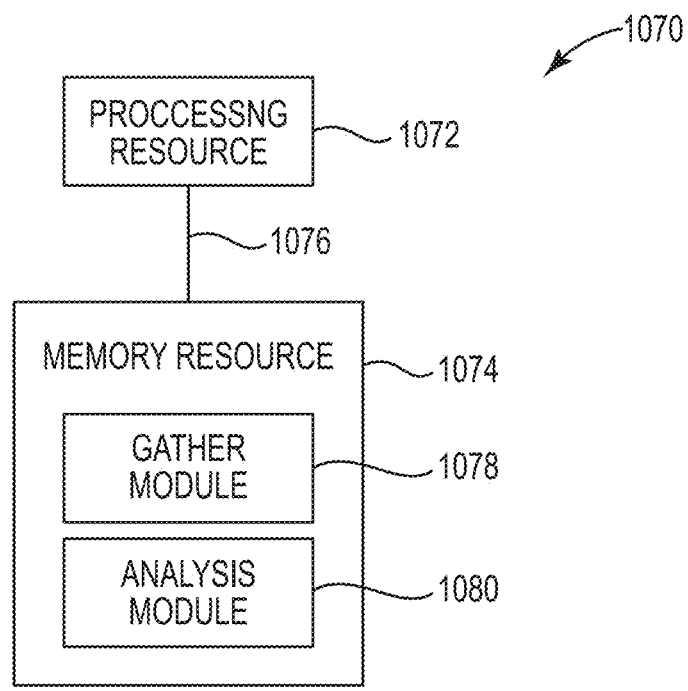
FIG. 10 illustrates a diagram of a machine for amplitude-versus-angle analysis for quantitative interpretation.

FIG. 10 illustrates a diagram of a machine 1070 for amplitude-versus-angle analysis for quantitative interpretation. The machine 1070 can utilize software, hardware, firmware, and/or logic to perform one or more functions. The machine 1070 can be a combination of hardware and program instructions configured to perform one or more functions (e.g., actions). The hardware, for example, can include one or more processing resources 1072 and one or more memory resources 1074, such as a machine-readable medium or other non-transitory memory resources 1074. The memory resources 1074 can be internal and/or external to the machine 1070, for example, the machine 1070 can include internal memory resources and have access to external memory resources. The program instructions, such as machine-readable instructions, can include instructions stored on the machine-readable medium to implement a particular function, for example, an action such as AVA analysis for quantitative interpretation. The set of machine-readable instructions can be executable by one or more of the processing resources 1072. The memory resources 1074 can be coupled to the machine 1070 in a wired and/or wireless manner. For example, the memory resources 1074 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 1074 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resources 1072 can be coupled to the memory resources 1074 via a communication path 1076. The communication path 1076 can be local or remote to the machine 1070. Examples of a local communication path 1076 can include an electronic bus internal to a machine, where the memory resources 1074 are in communication with the processing resources 1072 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 1076 can be such that the memory resources 1074 are remote from the processing resources 1072, such as in a network connection between the memory resources 1074 and the processing resources 1072. That is, the communication path 1076 can be a network connection. Examples of such a network connection can include a local area network, wide area network, personal area network, and the Internet, among others.

As shown in FIG. 10, the machine-readable instructions stored in the memory resources 1074 can be segmented into one or more modules 1078, 1080 that when executed by the processing resources 1072 can perform one or more functions. As used herein a module includes a set of instructions included to perform a particular task or action. The number of modules 1078, 1080 can be sub-modules of other modules. For example, the gather module 1078 can be a sub-module of the analysis module 1080 or vice versa. Furthermore, the number of modules 1078, 1080 can comprise individual modules separate and distinct from one another. Examples are not limited to the specific modules 1078, 1080 illustrated in FIG. 10.

Each of the number of modules 1078, 1080 can include program instructions and/or a combination of hardware and program instructions that, when executed by a processing resource 1072, can function as a corresponding engine as described with respect to FIG. 9. For example, the gather module 1078 can include program instructions and/or a combination of hardware and program instructions that, when executed by a processing resource 1072, can function as the gather engine 966 and/or the analysis module 1080 can include program instructions and/or a combination of hardware and program instructions that, when executed by a processing resource 1072, can function as the analysis engine 968.

The machine 1070 can include a gather module 1078, which can include instructions to create a plurality of angle gathers from imaging a subsurface location with multiples over a plurality of angles. The multiples can comprise down-going sea surface reflections in a near-offset range. The instructions to create the plurality of angle gathers further include instructions to create the plurality of angle gathers from imaging the subsurface location with primaries outside of the near-offset range. The gather module 1078 can include instructions to update a velocity model and adjust corresponding anisotropy parameters via wavelet shift tomography to solve for relatively longer wavelengths in the velocity model and perform FWI to solve for relatively shorter wavelengths in the velocity model. The gather module 1078 can include instructions to use the velocity model after FWI to migrate the multiples and primaries. The instructions to create the plurality of angle gathers can include instructions to create the plurality of angle gathers from imaging the subsurface location with the multiples and the primaries over the plurality of angles.

The machine 1070 can include an analysis module 1080, which can include instructions to apply an AVA analysis to the plurality of angle gathers to produce a quantitative interpretation pertaining to the subsurface location. The quantitative interpretation includes at least one of the group of quantitative interpretations including a determination of a property of the subsurface location, a prediction of a lithology of the subsurface location, and a prediction of a fluid at the subsurface location.

In accordance with one or more embodiments of the present disclosure, a geophysical data product may be produced. The geophysical data product may include, for example, an AVA analysis for quantitative interpretation. Geophysical data may be obtained and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility, for example, in the United States. In some instances, once onshore in the United States, geophysical analysis may be performed on the geophysical data product. In some instances, geophysical analysis may be performed on the geophysical data product offshore. For example, a plurality of angle gathers can be crated from imaging multiples in a near-offset range and imaging primaries outside the near-offset range, for example as the seismic data is being acquired or after it is acquired, offshore to facilitate other processing of the acquired seismic data either offshore or onshore. As another example, an AVA analysis can be applied to the plurality of angle gathers to produce a quantitative interpretation pertaining to the subsurface location, for example as the seismic data is being acquired or after it is acquired, offshore to facilitate other processing of the acquired seismic data either offshore or onshore.

FIG. 11 illustrates a method flow diagram for amplitude-versus-angle analysis for quantitative interpretation. At block 1190, the method can include creating a plurality of angle gathers from imaging a subsurface location with multiples over a plurality of angles, wherein the subsurface location is shallow such that primaries are not received from the subsurface location for a near-offset range. Creating the plurality of angle gathers can include performing SWIM to provide seismic data for the near-offset range. Providing data for the near-offset range can include illuminating angles in the near-offset range to improve discrimination of amplitude with angle for the AVA analysis. Illuminating angles means that the angles in the near-offset range were, prior to the data being provided for the near-offset range, too dim to provide meaningful information in the seismic image. Performing SWIM can include separating recorded seismic data into up-going wavefields and down-going wavefields. In at least one embodiment, the method can further include migrating the up-going wavefields and the down-going wavefields to the subsurface location and applying a deconvolution imaging condition at the subsurface location after the migration to create the plurality of angle gathers. The method can include applying a radial trace transform to a plurality of subsurface offset gathers to create the plurality of angle gathers.

At block 1192, the method can include applying an AVA analysis to the plurality of angle gathers to produce a quantitative interpretation pertaining to the subsurface location.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    updating, by a machine, a velocity model and adjusting corresponding anisotropy parameters via tomography to solve for relatively longer wavelengths in the velocity model;
    performing, by the machine, full waveform inversion to solve for relatively shorter wavelengths in the velocity model;
    using, by the machine, the velocity model after full waveform inversion to migrate up-going wavefields and down-going wavefields including primaries and multiples;
    creating, by the machine, a plurality of angle gathers from the migration, thereby imaging a subsurface location with multiples in a near-offset range and with primaries outside the near-offset range, wherein the subsurface location is shallow such that primaries are not received from the subsurface location for a near-offset range; and
    applying, by the machine, an amplitude-versus-angle analysis to the plurality of angle gathers to produce a quantitative interpretation pertaining to the shallow subsurface location.

2. The method of claim 1, wherein, the quantitative interpretation comprises at least one of a group of quantitative interpretations comprising:
    a property of the subsurface location;
    a prediction of a lithology of the subsurface location; and
    a prediction of a fluid at the subsurface location.

3. The method of claim 2, wherein the property of the subsurface location comprises one of the group of properties comprising:
    a direct hydrocarbon indicator; and
    an existence of a reservoir.

4. The method of claim 1, further comprising separating recorded seismic data into the up-going wavefields and the down-going wavefields including the primaries and the multiples.

5. The method of claim 1, further comprising creating the plurality of angle gathers from imaging the subsurface location with multiples outside the near-offset range.

6. The method of claim 1, further comprising applying a deconvolution imaging condition at the subsurface location to reduce crosstalk from unrelated correlation of the primaries and the multiples.

7. A non-transitory machine-readable medium storing instructions executable by a processing resource to, comprising:
    perform separated wavefield imaging, including separating recorded seismic data into up-going wavefields and down-going wavefields recorded in a non-transitory machine-readable medium, to provide seismic data for a near-offset range;
    wherein providing seismic data for the near-offset range includes illuminating angles in the near-offset range to improve discrimination of amplitude with angle for an amplitude-versus-angle analysis;
    migrate the up-going wavefields and the down-going wavefields to the subsurface location;
    apply a deconvolution imaging condition at the subsurface location after the migration to create a plurality of angle gathers from imaging a subsurface location with multiples over a plurality of angles, wherein the subsurface location is shallow such that primaries are not received from the subsurface location for a near-offset range; and
    apply the amplitude-versus-angle analysis to the plurality of angle gathers to produce a quantitative interpretation pertaining to the shallow subsurface location, the quantitative interpretation comprising a direct hydrocarbon indicator.

8. The medium of claim 7, further comprising instructions to apply a radial trace transform to a plurality of subsurface offset gathers to create the plurality of angle gathers.

9. The medium of claim 7, wherein the quantitative interpretation includes at least one of the group of quantitative interpretations including:
    a determination of a property of the subsurface location;
    a prediction of a lithology of the subsurface location; and
    a prediction of a fluid at the subsurface location.

10. The medium of claim 9, wherein the property of the subsurface location comprises one of the group of properties comprising:
    a direct hydrocarbon indicator; and
    an existence of a reservoir.

11. A system, comprising hardware of a machine configured to:
- update a velocity model and adjust corresponding anisotropy parameters via tomography to solve for relatively longer wavelengths in the velocity model;
- perform full waveform inversion to solve for relatively shorter wavelengths in the velocity model;
- use the velocity model after full waveform inversion to migrate up-going wavefields and down-going wavefields including primaries and multiples;
- create a plurality of angle gathers from the migration and record the plurality of angle gathers in a non-transitory machine-readable medium, thereby imaging a subsurface location with multiples over a plurality of angles, wherein the subsurface location is shallow such that primaries are not received from the subsurface location for a near-offset range; and
- apply an amplitude-versus-angle analysis to the plurality of angle gathers to produce a quantitative interpretation pertaining to the shallow subsurface location.

12. The system of claim 11, wherein, the quantitative interpretation comprises at least one of a group of quantitative interpretations comprising:
- a property of the subsurface location;
- a prediction of a lithology of the subsurface location; and
- a prediction of a fluid at the subsurface location.

13. The system of claim 12, wherein the property of the subsurface location comprises one of the group of properties comprising:
- a direct hydrocarbon indicator; and
- an existence of a reservoir.

14. The system of claim 11, wherein the multiples comprise down-going sea surface reflections in a near-offset range.

15. The system of claim 14, wherein the hardware of the machine is configured to create the plurality of angle gathers from imaging the subsurface location with primaries outside of the near-offset range.

16. The system of claim 11, wherein the recorded seismic data was recorded with multi-sensor seismic receivers in water having a depth less than 600 meters.

17. A method of generating a geophysical data product, the method comprising:
- obtaining geophysical data;
- processing the geophysical data, wherein processing the geophysical data comprises:
  - updating a velocity model and adjust corresponding anisotropy parameters via tomography to solve for relatively longer wavelengths in the velocity model;
  - performing full waveform inversion to solve for relatively shorter wavelengths in the velocity model;
  - using the velocity model after full waveform inversion to migrate up-going wavefields and down-going wavefields including primaries and multiples;
  - creating a plurality of angle gathers from the migration and record the plurality of angle gathers in a non-transitory machine-readable medium, thereby imaging a subsurface location with multiples over a plurality of angles, wherein the subsurface location is shallow such that primaries are not received from the subsurface location for a near-offset range;
  - applying an amplitude-versus-angle analysis to the plurality of angle gathers to produce a quantitative interpretation pertaining to the shallow subsurface location; and
- recording the geophysical data product on a non-transitory machine-readable medium thereby creating the geophysical data product.

18. The method of claim 17, wherein processing the geophysical data comprises processing the geophysical data offshore or onshore.

19. The method of claim 17, wherein the quantitative interpretation includes at least one of the group of quantitative interpretations including:
- a determination of a property of the subsurface location;
- a prediction of a lithology of the subsurface location; and
- a prediction of a fluid at the subsurface location.

20. The method of claim 19, wherein the property of the subsurface location comprises one of the group of properties comprising:
- a direct hydrocarbon indicator; and
- an existence of a reservoir.

* * * * *